Sept. 7, 1943.  J. T. ROONEY  2,328,585
OPTICAL COUNTING DEVICE AND PROCESS OF MAKING THE SAME
Filed Jan. 2, 1941
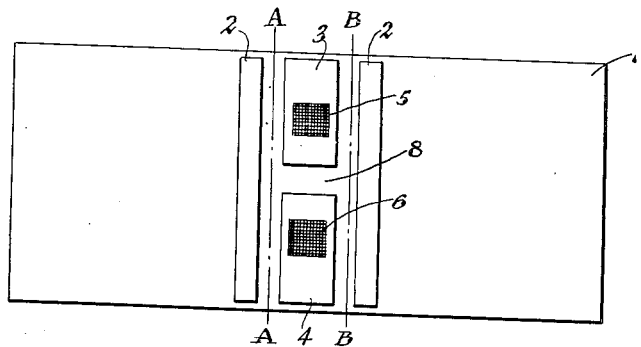
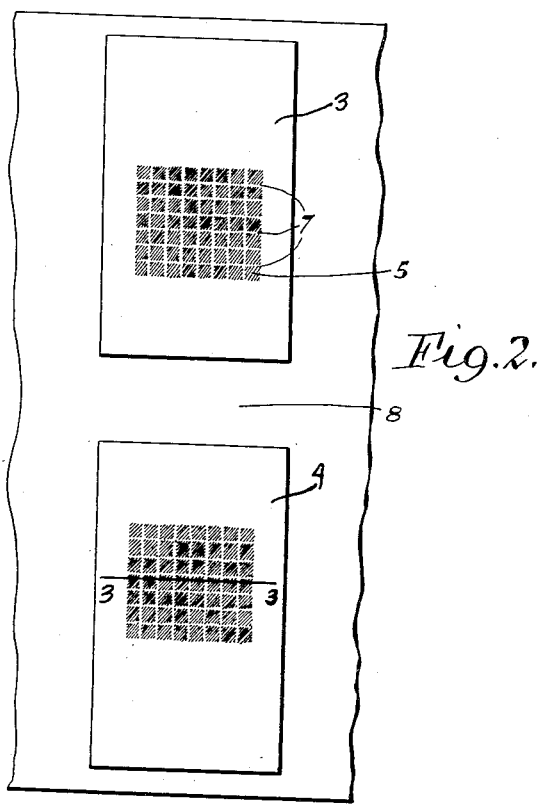
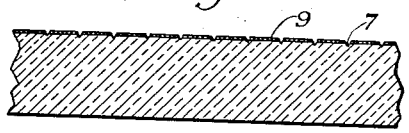
INVENTOR
JOHN T. ROONEY
BY
Raymond A. Paquin
ATTORNEY Patented Sept. 7, 1943

2,328,585

UNITED STATES PATENT OFFICE 2,328,585

OPTICAL COUNTING DEVICE AND PROCESS OF MAKING THE SAME

John T. Rooney, Buffalo, N. Y., assignor to Spencer Lens Company, Buffalo, N. Y., a corporation of New York Application January 2, 1941, Serial No. 372,779

7 Claims. (Cl. 88—40)

This invention relates to optical counting devices such as slides or counting chambers for microscopes and especially those known as haemacytometers and stage micrometers or the like, and the process of making the same.

An object of this invention is to provide an optical counting device having reference lines thereon, which lines are distinctly visible under the microscope and which device will be relatively simple and economical in construction, and the process of making the same.

Another object of the invention is to provide a transparent optical device with a transparent surface of a different color which will resist damage from cleaning or the like.

Another object of the invention is to provide an optical device having a base and a surface layer of such contrasting colors that lines cut through the surface layer will appear distinct and bright compared with the surrounding darker background when the device is viewed through a microscope, and the method of making the same.

Another object of the invention is to provide an optical device having a base and coating of contrasting colors and having reference lines on said coating, said reference lines extending through said coating into said base so that the lines will appear more distinct and bright when the device is viewed through a microscope or the like.

Another object of the invention is to provide an optical device having a transparent base with a transparent coating thereon of a contrasting color to said base and having reference lines thereon, which lines will appear distinct and bright when the device is viewed through the microscope.

Other objects and advantages of the invention will be apparent from the following description taken in connection with the accompanying drawing, and it will be understood that many changes may be made in the details of construction, arrangement of parts and steps of the process, without departing from the spirit of the invention as expressed in the accompanying claims. I therefore do not wish to be limited to the exact details of construction and steps of the process shown and described as the preferred form and process have been shown by way of illustration only.

Referring to the drawing:

Fig. 1 is a plan view of a counting device known as a haemacytometer constructed in accordance with this invention;

Fig. 2 is an enlarged fragmentary view of the portion of the device shown in Fig. 1 between lines A—A and B—B; and Fig. 3 is an enlarged fragmentary sectional view taken along the line 3—3 of Fig. 2.

In the past optical counting devices for use with a microscope or the like have been made in several ways. One of these methods comprised ruling the pattern or zones or areas directly on the glass. It has been difficult to do this because of the fineness of the lines which are frequently required and as it is also necessary that the lines be distinctly visible under the microscope. Because of the small difference in index of refraction between the glass slide and the liquid being examined, the lines were ruled directly on the glass slide and were visible only with the greatest difficulty.

Another method of constructing such devices was to provide the portions to be ruled with a semi-transparent coating of a metal or the like and then the lines or graduations ruled on said coated surface. While this type of construction has been very satisfactory, it has been found to be expensive due to the difficulty in obtaining a uniform coating of the metal on the glass. It is therefore one of the principal objects of this invention to provide a simple, efficient and economical device of the type set forth having graduations distinctly visible and which is simpler and more economical to manufacture than prior constructions.

Referring more particularly to the drawing wherein similar reference characters designate corresponding parts throughout the several views, the optical device shown comprising the invention comprises a plate 1 of glass or the like having spaced integral elevated ribs 2 across the face thereof. These ribs 2 serve to support a cover glass adapted to be placed over the specimen or object to be examined to provide a definite depth of the liquid to be examined, and which object is placed on the broad raised portions 3 and 4, the height of which is slightly less than the height of the ribs 2.

The raised portions 3 and 4 have portions of their surfaces 5 and 6 provided with graduations 7. While the entire surface of these portions 3 and 4 could be graduated, it has been found not necessary to do so because of the limited field that can be observed through the microscope.

Between the raised portions 3 and 4 is shown a depressed portion 8. This depressed portion is not important or essential as the number and extent of the members 3 and 4 can be any number of subdivided areas that may be desired on the slide.

The base member 1 is preferably constructed of a transparent optical material such as ordinary optical crown glass. It will be understood that this base member 1 may be colorless or may be of a transparent colored material of a color preferably lighter than the color of the coating 9 on the raised portions 3 and 4 hereinafter described.

On the surfaces of the portions 5 and 6 of the raised members 3 and 4 is placed a coating 9. This coating 9 is of a colored transparent material which is preferably of a color darker or contrasting to the color of the base member 1.

This coating 9 can be applied by numerous methods such as by spraying thereon a colored transparent glaze of any of the well known glazes fusible to the base portion 1 at a temperature lower than the melting point of the material of the base 1. It is, of course, desirable that the fusing temperature of the coating 9 be considerably lower than the temperature at which the base material 1 will be distorted. An example of such a coating would be any one of the well known glazes fusing at a low temperature and containing, as an example, one part per thousandth of chromium salts which would provide the transparent glass with an emerald green color which would contrast with the base member 1 which could be of colorless transparent material or could be of a light yellow color or other color which would sufficiently contrast with the darker green coating.

The coating 9 could also be of a color complementary to the color of the base, such as if the coating 9 were green as described, the base 1 could be red. In this case the object would be seen on a grey background divided by red graduations or lines.

It will be noted that by following the procedure outlined above and employing a colorless transparent base 1 and a transparent black coating 9, that the lines or graduations would appear clear or bright on a grey background and in this instance the maximum contrast would be obtained.

The coated article may then be placed in a furnace to fuse the coating to the surface of the glass body or the like 1.

The rulings or graduations 7 may then be formed by cutting or removing the coating material so that narrow strips of the coating are removed to leave fine reference lines extending across the coated area and defining reference zones thereon. These lines can be cut with a diamond pointed tool or a light cut could be made with the diamond tool and the lines etched with hydrofluoric acid to form the groove. It is preferable that the lines extend through the glazed coating into the base to obtain the brightest lines but it will be understood that it is only necessary to cut the lines through portions of the coating to obtain varying thicknesses of visibility of the lines if desired. If desired the coating could be applied, then baked at a comparatively low temperature to set the coating and the reference lines might be ruled and the article then placed in the furnace to fuse the coating to the base.

With the device formed as outlined above and with the base material 1 and the coating material 9 of contrasting colors the lines cut through the coating will appear distinct and bright on the darker background when the device is viewed through the microscope. This contrast is obtained by virtue of the transmission of different wave lengths of light in the visible spectrum by the lines 7, base material 1 and the coated background 9.

While in one of the examples given the base member 1 has been described as of colorless transparent material or transparent material of a yellowish color and the glazed coating 9 has been described as of a transparent deep green color, it will be understood that either of these members may be of any desired color so long as they are contrasting and transparent and preferably with the coating 9 of a deeper or darker color than the color of the base member 1.

It is pointed out that the greater the contrast between the color of the member 1 and the coating 9, the greater the visibility that will be given to the reference lines 7 when the article is viewed through the microscope.

It will be noted that while in the examples set forth, the coating 9 has been described as a fusible glaze, that, if desired, this coating may be of other transparent colored materials such as synthetic plastics, resins or enamels, lacquers or other suitable material and may be secured to the base by spraying, cementing, fusing or other suitable process.

It is also pointed out that if the base 1 were formed of suitable material, the contrasting colored layer could be formed in the surface of the base itself by spraying or otherwise applying to said surface a chemical capable of imparting thereto the desired color by adsorption or chemical combination.

From the above it will be seen that I have provided an optical counting device and the method of making the same which will accomplish all of the objects of the invention and wherein the device is efficient and accurate in use and relatively simple and economical of construction.

Having described my invention, I claim:

1. A microscopic slide or the like comprising a body portion of transparent material of a given controlled color having upon a portion of a face thereof a coating of inherently transparent material of a controlled color different from that of the body portion and having a plurality of subdivided areas along lines resulting from the effective removal of at least a portion of the material of the coating along said lines, said areas being of a transparent color resulting from light transmitted through the combined colors of said materials with the lines being predominately of the color of the material of the body portion.

2. A microscopic slide or the like comprising a body portion of transparent material of a given controlled color having upon a portion of a face thereof a coating of inherently transparent material of a controlled color different from that of the body portion and having a plurality of subdivided areas along lines resulting from the removal of at least a portion of the material of the coating along said lines, said areas being of a transparent color resulting from light transmitted through the combined colors of said materials with the lines being predominately of the color of the material of the body portion, the resultant color of said transparent areas being such, that when specimens to be examined are placed thereon, the said specimens will be rendered more easily visible.

3. A microscopic slide or the like comprising a body portion of transparent vitreous material having upon a portion of a face thereof a coating of vitreous transparent material of a controlled color different from that of the body portion and united through a superficial intermingling of the materials throughout the contiguous surfaces thereof, said coating having areas subdivided along lines resulting from the removal of at least a portion of the material of the coating along said lines, thereby causing the subdivided areas to be of a color resulting from the transmission of light through the body portion and said coating material with the said lines being predominately of the color of light transmitted by the material of the body portion.

4. A microscopic slide or the like comprising a body portion of transparent glass-like material having upon a portion of a face thereof a coating of glass-like transparent material of a controlled color different from that of the body portion and united through a superficial fusion of the materials throughout the contiguous surfaces thereof, said coating having areas subdivided along lines resulting from the removal of at least a portion of the material of the coating along said lines, thereby causing the subdivided areas to be of a color resulting from the transmission of light through the body portion and said coating material with the lines being predominately of the color of light transmitted by the material of the body portion.

5. The process of preparing a microscopic slide or the like comprising forming a body portion of transparent vitreous material of a controlled color, forming a coating of vitreous material of a controlled color, different from that of the body portion, upon a portion of a face of said body portion, with a superficial intermingling of the materials of said body portion and coating throughout the contiguous surfaces thereof and removing at least a portion of the material of the coating along defined lines to produce a plurality of subdivided areas of a color resulting from the transmission of light through the material of said body portion and the coating material with the color of said lines being predominately that of the color of the material of the body portion.

6. The process of preparing a microscopic slide or the like comprising forming a body portion of transparent glass-like material of a controlled color, forming a coating of glass-like material of a controlled color, different from that of the body portion, upon a portion of a face of said body portion, with a superficial fusion of the materials of said body portion and coating throughout the contiguous surfaces thereof and removing at least a portion of the material of the coating along defined lines to produce a plurality of subdivided areas of a color resulting from the transmission of light through the material of said body portion and the coating material with the color of said lines being predominately that of the color of the material of the body portion.

7. The process of forming a microscopic slide or the like comprising selecting a transparent material of a given controlled color, forming a body portion of said material, forming a coating of transparent material of a controlled color different from that of the body portion upon a portion of a face of said body portion, effectively removing at least a portion of the material of the coating along defined lines to produce a plurality of subdivided areas, said colors of said body portion and of said coating being so controlled as to produce a resultant color tending to render specimens placed thereon and under examination more easily visible with the extent of effective removal of said coating material along said lines being such as to cause the color of said lines to be predominately that of the color of the material of the body portion.

JOHN T. ROONEY.